UNITED STATES PATENT OFFICE.

JUSTIN LUTHER HILL, OF WILLIAMSPORT, PENNSYLVANIA.

LOTION AND TOILET WASH.

No. 885,154.　　　　Specification of Letters Patent.　　Patented April 21, 1908.

Application filed October 30, 1907.　Serial No. 399,892.　(Specimen.)

To all whom it may concern:

Be it known that I, JUSTIN LUTHER HILL, a citizen of the United States, residing at Williamsport, in the county of Lycoming and State of Pennsylvania, have invented a new and useful Composition of Matter to be Used as a Lotion and Toilet Wash, of which the following is a specification.

My composition consists of a distilled aqueous extract of the leaves and twigs of the hemlock tree (*Tsuga canadensis*) and of sweet fern (*Myrica* or *Comptonia aspleni-folia*) in substantially the proportion by weight, of four parts of hemlock to three parts of sweet fern, combined with from ten to twenty per cent. of ethyl alcohol, preferably the latter amount.

I put the hemlock and sweet fern in the proportions named, into a vessel or still with sufficient water to distill over one gallon to each sixteen ounces of hemlock and twelve ounces of sweet fern. It is not necessary that the leaves shall be immersed in the water, but it is sufficient if they be suspended, by a perforated bottom, above the water, so that the steam generated from the water, will pass through the leaves and thence into and through a condenser.

If preferred the hemlock and fern may be placed in a separate vessel made of wood or other material, and the steam from a boiler admitted by a pipe into the vessel under the leaves so as to pass through the leaves and thence into the condenser.

The steam passing through the leaves becomes heavily laden with the essential oils and other volatile qualities of the hemlock and sweet fern foliage, and after being condensed, the liquid so distilled amounting to about one gallon to each twenty-eight ounces of leaves, is combined with ten to twenty per cent. of alcohol, forming a composition having an agreeable woodland odor, and possessing marked healing, cooling and antiseptic qualities as a lotion or wash.

It is evident that the hemlock and sweet fern may be distilled separately and then mixed, but I prefer to distill them together.

It is possible to make a combination yielding fairly good results, without adhering closely to the proportions of four parts of hemlock to three parts of sweet fern, but I regard the proportions named as the best and most desirable for all purposes for which the preparation is useful.

For the best results the proportion of alcohol to the distilled extract should be about twenty per cent.

I am aware that it is not new to subject hemlock or sweet fern to a distilling process in order to extract their essential oils, but I am not aware that their aqueous distillates have ever been combined either with or without alcohol, to form a lotion as herein described.

What I claim and desire to secure by Letters Patent of the United States is—

A toilet lotion consisting of the distilled aqueous extract of hemlock four parts and sweet fern three parts, combined with twenty per cent. of alcohol substantially as described and for the purposes specified.

In testimony whereof I have signed my name to this specification in the presence of two subscribing witnesses.

JUSTIN LUTHER HILL.

Witnesses:
　H. RUSSELL HILL,
　B. BERNDT.